UNITED STATES PATENT OFFICE.

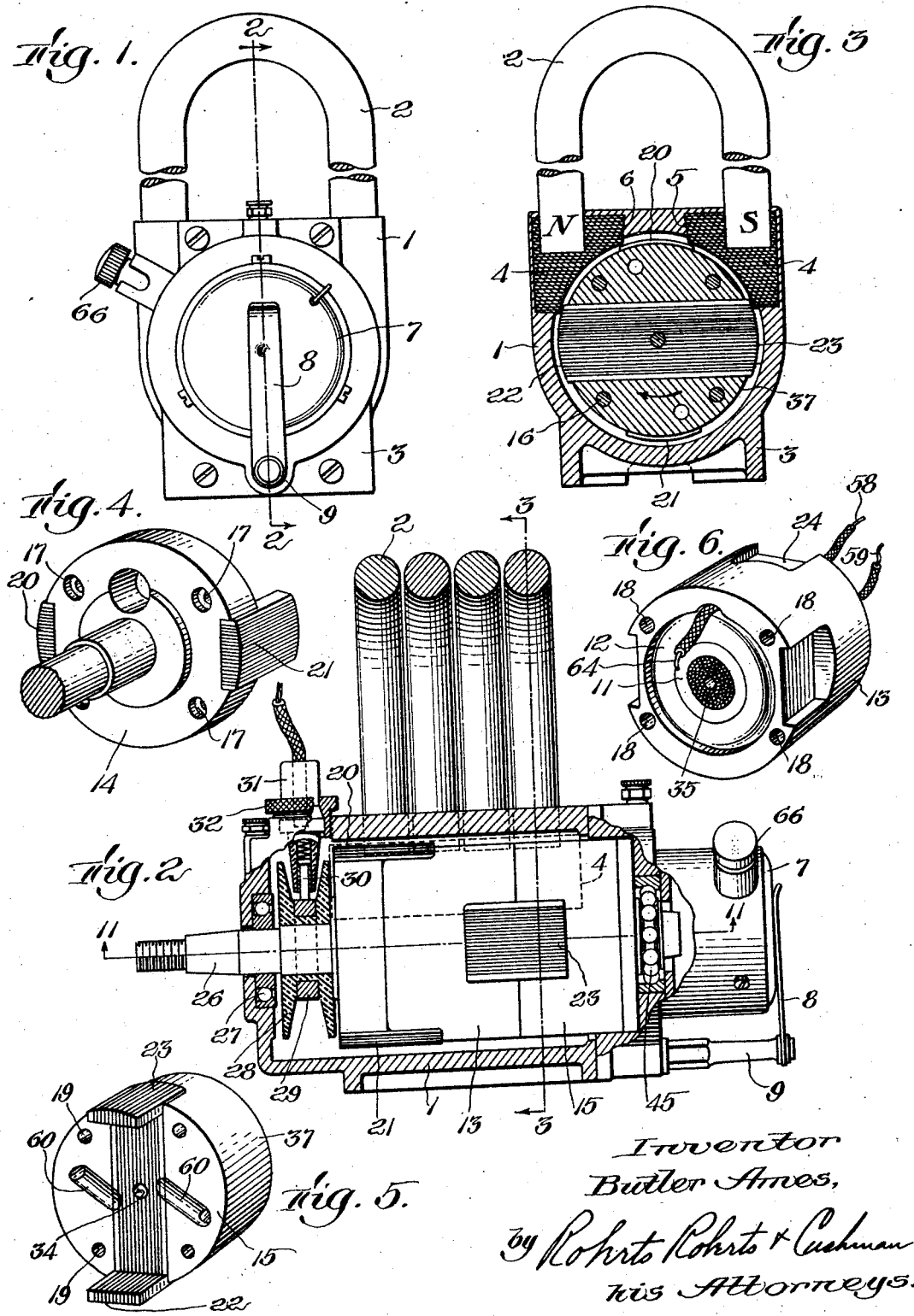

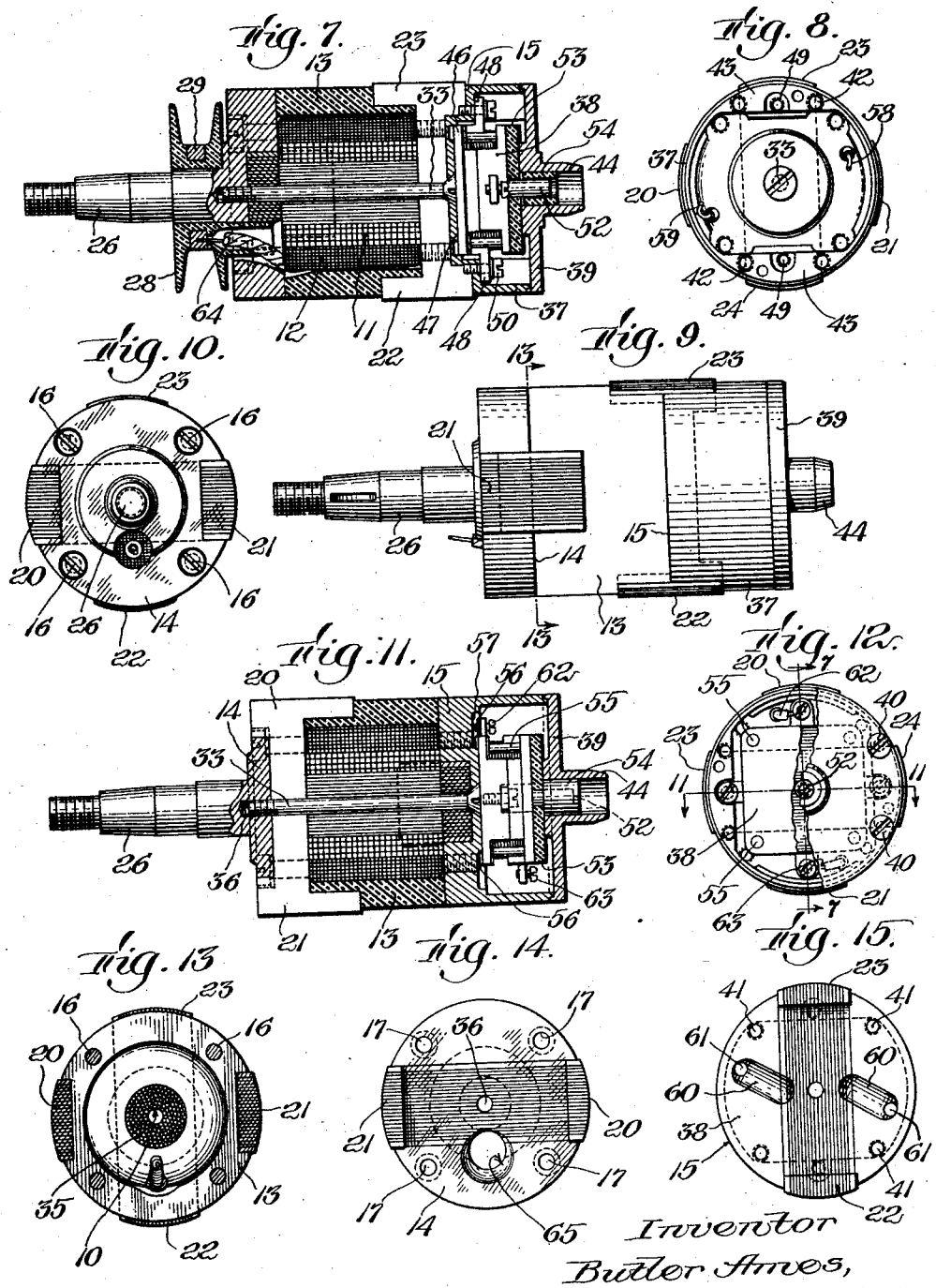

BUTLER AMES, OF LOWELL, MASSACHUSETTS.

ROTOR FOR ELECTRICAL MACHINES.

1,415,761.

Specification of Letters Patent. Patented May 9, 1922.

Application filed February 16, 1918. Serial No. 217,468.

*To all whom it may concern:*

Be it known that I, BUTLER AMES, a citizen of the United States, and resident of Lowell, in the county of Middlesex and State of Massachusetts, have invented new and useful Improvements in Rotors for Electrical Machines, of which the following is a specification.

This invention relates to electrical generators and more particularly to generators of the magneto type.

The principal objects of the invention are to provide a magneto generator which is light and compact in construction, which produces a relatively large number of impulses of current per pole, which will supply ignition impulses to either two or four cycle engines having any number of cylinders, whose magnetic circuit has low reluctance, whose windings encircle the axis of the rotor, which maintains high efficiency throughout a wide range of velocities and at relatively high velocities, in which the laminated portion of the magnetic circuit is rigidly and compactly incorporated with the other portions of the machine, and generally to improve and perfect apparatus of the character referred to. By utilizing the present invention only in certain of its aspects certain of the aforesaid objects may be attained independently of other of the objects but in its preferred form the invention permits the attainment of all of the aforesaid objects concomitantly.

The invention comprises improvements in both the rotor and stator of a generator and also in the association of these two parts together. The rotor is provided with an axial core and around this core is provided the windings, a single set in the case of an ordinary generator but preferably a plurality of sets in the case of a magneto generator. These windings are preferably mounted on the rotor for the sake of compactness and efficiency but, in so far as certain aspects of the invention are concerned, the windings may be non-rotatably mounted closely to surround the core inasmuch as the current is generated by varying the magnetic flux and not by moving conductors transversely through a constant magnetic field. On opposite sides of the windings magnetic pole pieces extend radially from the axial core, that is, away from the axis of the core although not necessarily perpendicularly to the axis of the core, a distance sufficient to bring them into proximity to the stator poles when the two sets of poles are rotated relatively to each other. While either or both sets of poles may be rotated, I preferably rotate the inner set and therefore designate the inner and outer sets as rotor and stator poles respectively. Moreover, this relative motion between the pole pieces is the only motion essential to the present invention in its broader aspect, it being possible to maintain both the windings and axial core stationary inasmuch as the relative motion between the pole pieces of the rotor and stator produces a varying magnetic field about the windings which generates the current. The outer ends of the radial portions of the rotor core which rotate along the faces of the stator core have a relatively large area so as to reduce the reluctance of the air-gap between the rotor and stator and this is preferably accomplished, when the radial portions extend beyond the periphery of the windings, by extending the outer ends of the radial portions axially over the windings. The radial portions of the rotor core at one end of the rotor are staggered with relation to the radial portions at the other end of the core, thereby affording certain unique advantages as will hereinafter appear.

My improved stator comprises a plurality of poles of opposite polarity spaced about the periphery of the core so as to cooperate with the rotor in producing a variable magnetic field about the windings of the machine as the rotor rotates. These poles are spaced apart an angular distance approximately equal to the angular distance between certain pairs of rotor poles, which pairs comprise one pole at each end of the rotor, and for most purposes I deem it preferable to make this distance approximately equal to the angular distance between adjacent rotor poles. Thus, when employing two stator poles and four rotor poles (two at each end) the stator poles are spaced apart a distance of approximately 90°. However, when the angular distance between adjacent rotor poles is small, as for example when employing a large number of rotor poles, the stator poles may be spaced further apart. For example, when employing two stator poles and eight rotor poles (four at each end) the stator poles may be spaced apart three rotor pole spaces instead of a single space, that is, 135° instead of 45°. When employing only a single pair of stator poles cooperating with adjacent rotor poles the stator poles may be disposed on one side of the rotor so that the entire width of the device need be only slightly greater than the diameter of the rotor. The stator is claimed in my divisional application Ser. No. 465,414 filed April 29, 1921.

In the accompanying drawings,—

Figure 1 is an end elevation of one embodiment of my improved device.

Figure 2 is a vertical longitudinal central section of the device, parts being shown in elevation;

Figure 3 is a vertical transverse section on line 3—3 of Fig. 2;

Figures 4, 5 and 6 are perspective views of the left and right end portions, respectively, of the rotor in the relative positions in which they go together;

Figure 7 is a longitudinal central section of the rotor, taken on line 7—7 of Fig. 12;

Figure 8 is an elevational view of the inside of the condenser casing which is adapted to be mounted on the right end of the rotor as shown in Figs. 2, 7, 9 and 10;

Figure 9 is a side elevation of the rotor;

Figure 10 is a left end elevation of the rotor;

Figure 11 is a longitudinal central section of the rotor taken on lines 11—11 of Figs. 2 and 12 at right angles to the section in Fig. 7;

Figure 12 is a right end elevation of the rotor, parts being broken away to show the interior of the condenser casing and condenser therein;

Figure 13 is a vertical transverse section of the rotor, taken on line 13—13 of Fig. 9;

Figure 14 is an elevational view of the inside of the left end portion of the rotor; and Figure 15 is an elevational view of the inside of the right end of the rotor.

The stator of my improved generator resembles the ordinary construction in that it comprises a casing 1 surrounding the rotor, and in that permanent U-magnets are employed to produce the magnetic field, four such magnets being shown in Figs. 1, 2 and 3. The casing 1 is substantially cylindrical in contour, although in external appearance it appears rectangular inasmuch as it is provided with a base 3 and inasmuch as its sides are carried upwardly to enclose the pole pieces 4 which preferably extend the full length of the rotor core. The pole pieces 4 are preferably formed of laminations disposed in horizontal longitudinal planes and posed in these laminations are preferably cast into the frame 1. The surfaces 5 and 6 of the pole pieces are preferably tapered so that the laminations are rigidly held in the frame. The U-magnets 2 pass through openings in the top of the casing 1 and project into the poles 4 a short distance. The recesses in the poles 4 for the U-magnets are formed by stamping circular openings in the upper laminations before building them into pole pieces so that the magnets fit squarely against both the bottoms and sides of the recesses. Within the casing 7 at the right hand (Fig. 2) end of the frame 1 is provided switch mechanism of the usual type to make and break the armature circuit at suitable intervals, the casing 7 being held in position over the switch mechanism by means of a spring 8 pivotally mounted on the end of a stud 9 projecting from the left end of the frame 1.

By making the field magnets circular in cross-section a marked increase in efficiency is attained. Moreover, circular magnets may be hardened more easily and uniformly inasmuch as, unlike rectangular magnets, they present no corners to become unduly hard during the tempering process. I have also found that the efficiency and life of the magnets is greatly increased by spacing them apart so that they do not contact with each other.

My improved rotor, exemplified in the accompanying drawings, comprises an axial core 10 preferably formed of a bundle of wires, the core being surrounded by primary and secondary windings 11 and 12, a cylinder of insulating material 13 surrounding the windings, and end members 14 and 15 fastened to opposite ends of the cylinder 13 by means of machine screws 16 passing through the insulated openings 17 in the left end member 14, thence through the openings 18 in the cylinder 13 and thence threading into tapped openings 19 in the right end member 15. In order further to secure the aforesaid parts of the rotor together I also provide an axial machine screw 33 passing through an axial opening 34 in the right end member 15, thence through the axial opening 35 in the core, and thence threading into an axial recess 36 in the left end member 15.

The cylinder 13 of phenolic condensation products or the like serves to confine the armature windings and retain them in position even at high armature velocities. Due to the substantial thickness of the cylinder 13 the ends of the pole pieces may be embedded therein and the rods 16 may extend therethrough. With the end disks 14 and 15 tied together by rods 16 near the outer periphery of the armature and with the ends of the pole pieces embedded in the insulation cylinder the armature is exceedingly strong and rigid and will withstand a markedly high torsioning stress. By extending the end disks 14 and 15 to the cylinder 13 the windings are enclosed at the ends as well as at the sides.

In the end members 14 and 15 are provided transverse pole pieces 20, 21, 22 and 23, the pole pieces 20 and 21 at one end of the rotor being integrally formed of laminations disposed in planes parallel to the axis of the rotor and the poles pieces 22 and 23 at the other end of the rotor being similarly formed. For the purpose of rigidly and compactly mounting these pole pieces they are preferably cast into the end members of the rotor, the latter preferably being formed of cast aluminum. In order to increase the area of the ends of the pole pieces, and for other purposes, projections are provided on the outer ends of the poles, the projections extending inwardly in parallelism with the axis of the rotor into the recesses 24 and 25, respectively, in the cylinder of insulation 13. The outer peripheral faces of the pole-piece projections are made concentric with the axis of the rotor, and the radius of the pole pieces, including these projections, is such that the air-gap between the peripheral faces of the rotor poles and the inner faces of the stator poles is small. When the end portions 14 and 15 are secured to the central portion of the rotor, comprising the core 10, the windings and the cylinder 13, the ends of the cord 10 abut squarely against the inner faces of the pole pieces in the region of the axis of the rotor, thereby forming a practically continuous laminated magnetic circuit from the peripheral faces of the pole pieces 20 and 21 to the peripheral faces of the pole pieces 22 and 23, through the core 10. The pole pieces at one end of the rotor are staggered relatively to the pole pieces at the other end of the rotor for purposes which will hereinafter appear.

Projecting outwardly from the left (Fig. 2) end of the rotor is an axial shaft 26 by means of which the rotor is supported at the left end through the medium of ball bearings 27 and by which the rotor may be driven. Fast on the shaft 26 between the end of the rotor and the bearing 27 is a slip ring or collector ring comprising a pulley-shaped member 28 and a conducting ring 29. In cooperative relationship with the slip ring 29 is mounted a collector brush 30 by means of a tube 31 of insulating material mounted in a knurled nut 32 threading into an opening in the top of the frame 1.

The right end member 15 of the rotor is provided with a peripheral flange 37 extending to the right (Fig. 7), this flange serving as a housing for the condenser 38. The open end of the housing formed by flange 37 is covered over by a cap 39 which is secured to the flange 37 by means of machine screws 40 passing through openings 41 in the cap 39 and thence threading into tapped holes 42 in the thickened portions 43 of the flange 37. The cap 39 is provided with an axial tubular projection 44 by which the right end of the rotor is rotatably mounted in the frame 1 through the medium of the ball bearing 45.

The condenser 38, which forms the subject-matter of an application by myself and Philip Gilinson, Sr. No. 217,441 filed February 15, 1918, comprises a plurality of alternate layers of insulating and conducting material disposed between two end plates 46 and 47. Projecting outwardly from the opposite sides of plate 46 are integral lugs 48 which seat against the bottom of grooves 49 on the inside of the thick portions 43 of flange 37. Screws 50 pass through openings in the lugs 48 and thread into tapped openings in the bottoms of the grooves 49, thereby rigidly securing the condenser to the end portion 15 of the rotor. Projecting axially from the end plate 47 of the condenser is a tubular projection 52, the tubular projection passing through a plate 53 of insulating material into the tubular projection 44 on the end plate 39, a bushing of insulating material 54 being provided between the projections 52 and 44. Projection 52 has a tapped axial opening in its outer end as shown in Fig. 12, which is adapted to receive the end of a screw passing through the switch mechanism (not shown) in housing 7 to secure the switch mechanism to the rotor.

The end plates 46 and 47 of the condenser are secured together by four rivets 55 disposed at the four corners of the condenser, the rivets passing through and being insulated from plate 46, and being riveted into plate 47. As shown in Fig. 11, the heads 56 of these rivets project somewhat from the face of the plate 46, and in order to prevent the heads 56 from engaging the outer face of the end portion 15 of the rotor, an annular recess 57 is provided, whereby the flat face of the plate 46 is permitted to seat squarely against the end portion 15 and whereby the rivets 55, each of which is in electrical contact with the plate 47, do not short circuit the condenser plates 46 and 47 by engaging the end portion 15 of the rotor.

The terminals 58 and 59 of the primary winding 11 pass outwardly through grooves 60 in the inner face of right end member 15, thence through openings 61 in the end member to the terminals 62 and 63 on plates 46 and 47 of the condenser. One of the terminals 64 of the secondary winding 12 is brought out through an opening 65 in the left end member 14 and thence through a tubular projection on the insulation member 28 to the slip ring 29. The other of the terminals of the secondary winding is connected to one of the terminals of the primary winding either within the windings or at one of the terminals of the condenser. The make-and-break switch in the housing 7 is connected across the condenser 38 according to well established practice. One side of the switch is connected to the external circuit through the medium of the binding post 66 projecting outwardly from the casing 7 (Fig. 2), the other side of the switch and condenser being grounded. Inasmuch as the circuit arrangements form no part of the present invention, further description thereof is unnecessary.

The apparatus is preferably assembled as follows: The iron wires forming the core 10 are suitably secured in the form of a hollow cylinder, a cylindrical shell of suitable material being disposed either inside or outside or both inside and outside of the hollow core, if desired, to hold the wires together, although shellac or other insulating and adhesive material will ordinarily suffice. The rotor windings may be wound in the form of a coil before being placed on the rotor, and then slipped over the core and lightly secured to the core by adhesive insulating material. The cylinder 13 of insulation material is then slipped over the windings and positioned by a coating of shellac or the like spread between the windings and cylinder. The end members 14 and 15 of the rotor are preferably cast, as stated, with the laminated pole pieces cast thereinto. When employing only two pole pieces at each end of the rotor they are preferably formed integrally in the form of continuous laminations extending along the entire length of the diameter of the rotor. The end members 14 and 15 are then placed in position at opposite ends of the rotor, with the projections on the ends of the pole pieces extending into the recesses in the cylinder of insulation 13 and with the winding leads extending through the openings in the end members provided therefor. The parts are then secured together by means of screws 16 and 33. The condenser is then secured in position, with its terminals connected to the primary leads, and the cap member 39 secured over the opening into the condenser housing. The other parts of the rotor are then applied and the entire rotor mounted in the frame of the stator.

The operation of the device is as follows: When the rotor is rotated the poles 20 to 23 of the rotor alternately pass the poles 4 of the stator. Assuming that the left stator pole is the north pole and the right stator pole is the south pole, as indicated in Fig. 3, the action of the magnetic field may be explained as follows: When the rotor pole 20 is in opposition to the north pole N of the stator the rotor pole 23 will be in opposition to the south pole S and magnetic flux may be assumed to flow from the north stator pole N through rotor pole 20 to the axis of the rotor, thence through the axial core 10 to the opposite end of the rotor, and thence through rotor pole 23 to the south pole S of the stator. When the rotor has rotated through 90°, for example in a clockwise direction as indicated by the arrow in Fig. 3, the rotor pole 20, which was formerly in opposition to the north pole of the stator, will have moved into a position opposite to the south stator pole S, and the rotor pole 22 (opposite to rotor pole 23) will have moved into a position opposite to the north stator pole N. The flux through the rotor will then be reversed, the flux entering from the north stator pole N through the rotor pole 22, passing through the core 10, and thence passing through the rotor pole 20 to the south stator pole S. When the rotor has rotated through another 90° the rotor pole 22 will be opposed to the stator pole S and the rotor pole 21 will have moved into opposition to the stator pole N, in which position the flux through the rotor will again be reversed. Thus the flux through the rotor will be reversed four times per revolution of the rotor, and the apparatus will therefore produce four impulses of current per revolution. The device is therefore particularly adapted to use with eight-cylinder engines inasmuch as it can be driven at the same velocity as the engine and at the same time produce four sparks per revolution as required by an ordinary eight-cylinder engine.

When employing four rotor poles 20, 21, 22 and 23, arranged in staggered relationship as shown, and when using two stator poles spaced apart an angular distance of 90° it will be observed that each of the rotor poles are active throughout 90° of each rotation, namely, while passing the stator poles, and that each rotor pole is then inactive throughout substantially 270°. Owing to this long inactive period the residual magnetism in the rotor poles is permitted to die out and become neutralized before the pole again comes into operative relationship with the stator poles. By staggering the poles of the rotor and arranging the stator poles an angular distance apart approximately equal to the angular distance between a rotor pole at one end of the rotor and a rotor pole at the other end of the rotor a greater number of impulses of current are obtained than where the rotor poles are not staggered and where the stator poles are spaced 180° apart. Thus when employing four rotor poles and two stator poles as illustrated, four impulses of current per revolution are obtained instead of two. Obviously by increasing the number of rotor poles and at the same time arranging them in staggered relationship any desired number of impulses per revolution could be obtained. Moreover, instead of using only a single pair of stator poles a plurality of pairs may be employed. The extensions on the ends of the rotor poles provide an increased pole area opposing the stator poles whereby the reluctance of the air-gaps is materially decreased. Moreover, these extensions, when arranged to project over the armature windings as illustrated, serve in conjunction with the cylinder of insulation 13 to counteract the centrifugal force applied to the rotor windings and the device can therefore be safely operated at unusually high velocities.

I claim:

1. In an electrical machine, a rotor comprising an axial magnetic core, a winding mounted upon the core coaxially with the rotor, end members on opposite sides of the winding, and laminated pole pieces secured in the end members, the pole pieces being disposed in juxtaposition to the core and extending radially from the axial region of the rotor.

2. In an electrical machine, a rotor comprising a core, a winding encircling the core, the core and winding being disposed coaxially of the rotor, end members disposed on opposite sides of the winding, the end members having radial pole pieces extending outwardly from the region of the ends of said core, and bearing members extending outwardly from the end members.

3. In an electrical machine, a rotor comprising a core, a winding encircling the core, the core and winding being disposed coaxially of the rotor, end members disposed on opposite sides of the winding, the end members having radial pole pieces extending outwardly from the region of the ends of said core and having bearing members extending outwardly from the end members, a cylinder of insulating material surrounding the winding, said cylinder having recesses in the opposite ends thereof and said pole pieces having projections extending into the recesses.

4. In an electrical machine, a rotor comprising a core, a winding encircling the core, the core and winding being disposed coaxially of the rotor, end members disposed on opposite sides of the winding, the end members having radial pole pieces extending outwardly from the region of the ends of said core, one of the end members having a recess adapted to receive a condenser, and bearing members extending outwardly from said end members.

5. In an electrical machine, a rotor comprising a core, a winding encircling the core, the core and winding being disposed coaxially of the rotor, end members disposed on opposite sides of the winding, the end members having radial pole pieces extending outwardly from the region of the ends of said core, one of the end members having an annular flange extending outwardly therefrom so as to form a housing for a condenser, and bearing members extending outwardly from said end members.

6. A rotor comprising an axial core, a winding surrounding said core, a cylinder of rigid insulating material surrounding said winding, end members covering the ends of said winding and the ends of said cylinder, and rods extending longitudinally through said cylinder for connecting said end members together.

7. A rotor comprising an axial core, a winding surrounding said core, a cylinder of rigid insulating material surrounding said winding, said core and winding and cylinder having substantially equal axial lengths, and end disks covering the ends of said core winding and cylinder.

8. A rotor comprising an axial core, a winding surrounding said core, a cylinder of rigid insulating material surrounding said winding, said core winding and cylinder having substantially equal axial lengths, end disks covering the ends of said core winding and cylinder, and rods extending longitudinally through said cylinder for connecting said end disks together.

9. A rotor comprising an axial core, a winding surrounding said core, disks covering the ends of said core and winding, and radial pole pieces mounted on said disks in magnetic contact with said core.

10. A rotor comprising an axial core, a winding surrounding said core, disks covering the ends of said core and winding, and radial pole pieces formed integrally with said disks in magnetic contact with said core, said disks being formed of high reluctance metal and said pole pieces being formed of low reluctance metal.

11. A rotor comprising an axial core, a winding surrounding said core, disks covering the ends of said core and winding, and radial pole pieces mounted on said disks in magnetic contact with said core, said disks being formed of high reluctance metal and said pole pieces being formed of low reluctance laminations set edgewise into the inner sides of said disks.

12. A rotor comprising an axial core, a winding surrounding said core, end members covering the ends of said winding, and a rod extending axially through said core for connecting said end members together.

13. A rotor comprising an axial core, a winding surrounding said core, disks covering the ends of said core and winding, and a rod extending axially through said core for connecting said end members together.

14. A rotor comprising an axial core, a winding surrounding said core, a cylinder of insulating material surrounding said winding, disks covering the ends of said core winding and cylinder, and a plurality of rods extending longitudinally through said cylinder for connecting said disks together.

15. A rotor comprising an axial core, a winding surrounding said core, a cylinder of insulating material surrounding said winding, disks covering the ends of said core winding and cylinder, a plurality of rods extending longitudinally through said cylinder for connecting said disks together, and radial pole pieces mounted in said disks substantially in magnetic contact with said core.

Signed by me at Boston, Massachusetts, this 5th day of February, 1917.

BUTLER AMES.